US012675130B2

(12) United States Patent
Dong et al.

(10) Patent No.: US 12,675,130 B2
(45) Date of Patent: Jul. 7, 2026

(54) CHIP, CHIP SYSTEM, AND TIMESTAMP SYNCHRONIZATION METHOD

(71) Applicants:Beijing Youzhuju Network Technology Co., Ltd., Beijing (CN); Lemon Inc., Grand Cayman (KY)

(72) Inventors: Weifeng Dong, Beijing (CN); Jincai Ye, Beijing (CN); Yuanlin Cheng, Beijing (CN); Pengfei Liu, Beijing (CN); Xinxia Jia, Beijing (CN); Shan Lu, Los Angeles, CA (US); Jian Wang, Beijing (CN)

(73) Assignees: Beijing Youzhuju Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 132 days.

(21) Appl. No.: 18/634,421

(22) Filed: Apr. 12, 2024

(65) Prior Publication Data

US 2024/0345620 A1 Oct. 17, 2024

(30) Foreign Application Priority Data

Apr. 12, 2023 (CN) .......................... 202310389475.3

(51) Int. Cl.
*G06F 1/12* (2006.01)

(52) U.S. Cl.
CPC ....................................... *G06F 1/12* (2013.01)

(58) Field of Classification Search
CPC ................. G06F 1/32; G06F 1/12; G06F 9/44
See application file for complete search history.

(56) References Cited

U.S. PATENT DOCUMENTS

2006/0182214 A1* 8/2006 Hwang ..................... G06F 1/10
375/359
2023/0341892 A1* 10/2023 Jiang ......................... G06F 1/12

FOREIGN PATENT DOCUMENTS

CN 101447861 A 6/2009
CN 103929293 A 7/2014
(Continued)

OTHER PUBLICATIONS

International Search Report and Written Opinion received for PCT Patent Application No. PCT/CN2024/086607, mailed on Jun. 24, 2024, 9 pages.
(Continued)

*Primary Examiner* — Keshab R Pandey

(57) ABSTRACT

A chip, a chip system, and a timestamp synchronization method. The chip is configured to be in communication connection to another chip, and includes a signal generating module, a first signal response module and a first delay module. The signal generating module is configured to generate a synchronization request signal and transmit the synchronization request signal to the first signal response module and the another chip, so that the another chip records a second timestamp of the another chip in response to receiving the synchronization request signal. The first delay module is configured to perform delay processing on the synchronization request signal to obtain a delayed synchronization request signal. The first signal response module is configured to record a first timestamp of the chip in response to receiving the delayed synchronization request signal, wherein the first timestamp and the second timestamp are used for performing a timestamp synchronization operation.

18 Claims, 5 Drawing Sheets

(56)            References Cited

FOREIGN PATENT DOCUMENTS

| | | | |
|---|---|---|---|
| CN | 104158646 | A | 11/2014 |
| CN | 110290434 | A | 9/2019 |
| CN | 114115434 | A | 3/2022 |
| CN | 114125724 | B | 7/2022 |
| CN | 113055149 | B | 9/2022 |
| CN | 115486798 | A | 12/2022 |
| JP | 2006-295275 | A | 10/2006 |
| TW | 202113614 | A | 4/2021 |

OTHER PUBLICATIONS

Jackzhang,"Design of high-precision synchronous clock system based on FPGA", Xilinx, retrieved from https://xilinx.eetop.cn/viewnews-2459, Jul. 15, 2015, 12 pages.
Office Action received for Taiwan Patent Application No. 112113560, mailed on Jan. 29, 2024, 16 pages (4 pages of English Translation and 12 pages of Original Document).

* cited by examiner

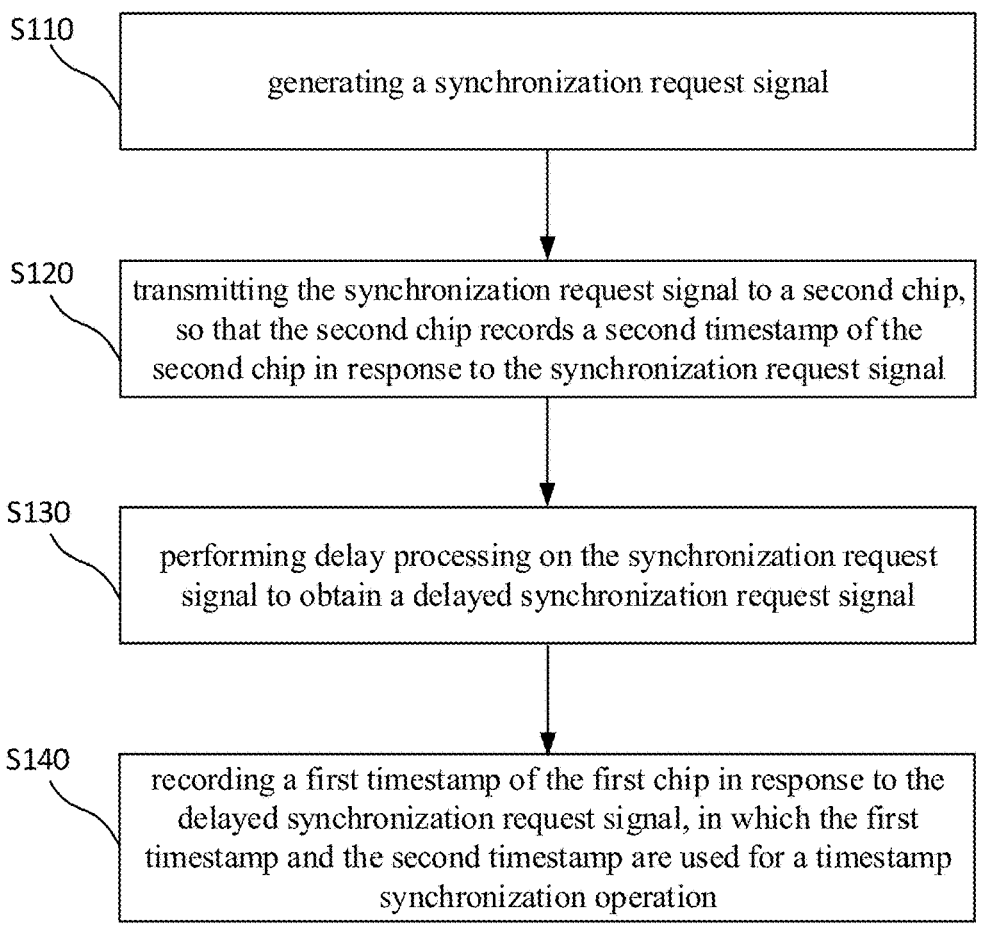

S110 — generating a synchronization request signal

S120 — transmitting the synchronization request signal to a second chip, so that the second chip records a second timestamp of the second chip in response to the synchronization request signal S130 — performing delay processing on the synchronization request signal to obtain a delayed synchronization request signal S140 — recording a first timestamp of the first chip in response to the delayed synchronization request signal, in which the first timestamp and the second timestamp are used for a timestamp synchronization operation

FIG. 10

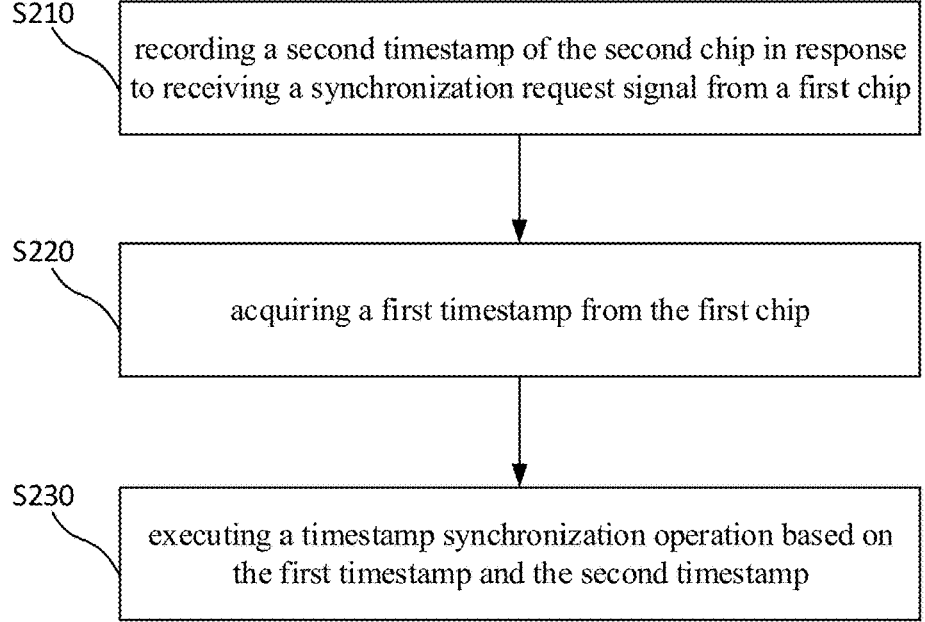

S210 — recording a second timestamp of the second chip in response to receiving a synchronization request signal from a first chip S220 — acquiring a first timestamp from the first chip S230 — executing a timestamp synchronization operation based on the first timestamp and the second timestamp

FIG. 11

CHIP, CHIP SYSTEM, AND TIMESTAMP SYNCHRONIZATION METHOD

CROSS-REFERENCE TO RELATED APPLICATION

The present application claims priority of the Chinese Patent Application No. 202310389475.3, filed on Apr. 12, 2023, the entire disclosure of which is incorporated herein by reference as part of the present application.

TECHNICAL FIELD

Embodiments of the present disclosure relate to a chip, a chip system, and a timestamp synchronization method.

BACKGROUND

Electronic devices need to represent time using timestamp data, and the timestamp data can help a system user perceive and measure a time delay. In a multi-chip interconnected chip system, in order to improve the measurement accuracy of the time delay, it is necessary to ensure that all chips maintain the same timestamp data. Each chip in the system has its own independent timestamp counter. Enable times of timestamp counters on the chips are not synchronous during system initialization and/or input clocks of the chips may be of different sources, which may lead to differences in timestamp data between the chips during system operation, and thus, the accuracy at which the system user calculates time delay is affected. Therefore, a timestamp synchronization scheme may be introduced into the multi-chip interconnected system to address the problem of the differences in timestamp data between the chips.

SUMMARY

At least one embodiment of this disclosure provides a chip, configured to be in communication connection to another chip, including a signal generating module, a first signal response module and a first delay module, in which the signal generating module is configured to generate a synchronization request signal and transmit the synchronization request signal to the first signal response module and the another chip, so that a second signal response module of the another chip records a second timestamp of the another chip in response to receiving the synchronization request signal; the first delay module is configured to perform delay processing on the synchronization request signal transmitted from the signal generating module to the first signal response module to obtain a delayed synchronization request signal; and the first signal response module is configured to record a first timestamp of the chip in response to receiving the delayed synchronization request signal, in which the first timestamp and the second timestamp are used for performing a timestamp synchronization operation.

At least one embodiment of this disclosure provides a chip, configured to be in communication connection to another chip, including: a second signal response module and a second synchronization control module, in which the second signal response module is configured to record a second timestamp of the chip in response to receiving a synchronization request signal from the another chip, and transmit the synchronization request signal to the second synchronization control module; and the second synchronization control module is configured to, in response to receiving the synchronization request signal, acquire the second timestamp from the second signal response module, and acquire a first timestamp from the another chip, and execute a timestamp synchronization operation based on the first timestamp and the second timestamp; in which the first timestamp is a timestamp of the another chip recorded by a first signal response module of the another chip in response to a delayed synchronization request signal.

At least one embodiment of this disclosure provides a chip system, including a first chip and a second chip, in which the first chip includes a signal generating module, a first signal response module, and a first delay module; and the second chip is configured to be in communication connection to the first chip, and including a second signal response module and a second synchronization control module; in which the signal generating module is configured to generate a synchronization request signal, and transmit the synchronization request signal to the first signal response module and the second chip; the first delay module is configured to perform delay processing on the synchronization request signal transmitted from the signal generating module to the first signal response module to obtain a delayed synchronization request signal; and the first signal response module is configured to record a first timestamp of the first chip in response to receiving the delayed synchronization request signal; and the second signal response module is configured to record a second timestamp of the second chip in response to receiving the synchronization request signal from the first chip, and transmit the synchronization request signal to the second synchronization control module; and the second synchronization control module is configured to, in response to receiving the synchronization request signal, acquire the second timestamp from the second signal response module, and acquire the first timestamp from the first chip, and execute a timestamp synchronization operation based on the first timestamp and the second timestamp.

At least one embodiment of this disclosure provides a timestamp synchronization method, used for a first chip configured to be in communication connection to a second chip, and the method includes: generating a synchronization request signal; sending the synchronization request signal to the second chip, so that the second chip records a second timestamp of the second chip in response to the synchronization request signal; performing delay processing on the synchronization request signal to obtain a delayed synchronization request signal; and recording a first timestamp of the first chip in response to the delayed synchronization request signal, in which the first timestamp and the second timestamp are used for a timestamp synchronization operation.

At least one embodiment of this disclosure provides a timestamp synchronization method, used for a second chip configured to be in communication connection to a first chip, and the method includes: recording a second timestamp of the second chip in response to receiving a synchronization request signal from the first chip; acquiring a first timestamp from the first chip, in which the first timestamp is a timestamp of the first chip recorded by the first chip in response to a delayed synchronization request signal; and executing a timestamp synchronization operation based on the first timestamp and the second timestamp.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

FIG. 10 shows a flowchart of a timestamp synchronization method for a first chip provided in at least one embodiment of the present disclosure; and FIG. 11 shows a flowchart of a timestamp synchronization method for a second chip provided in at least one embodiment of the present disclosure.

DETAILED DESCRIPTION

Figure 1:
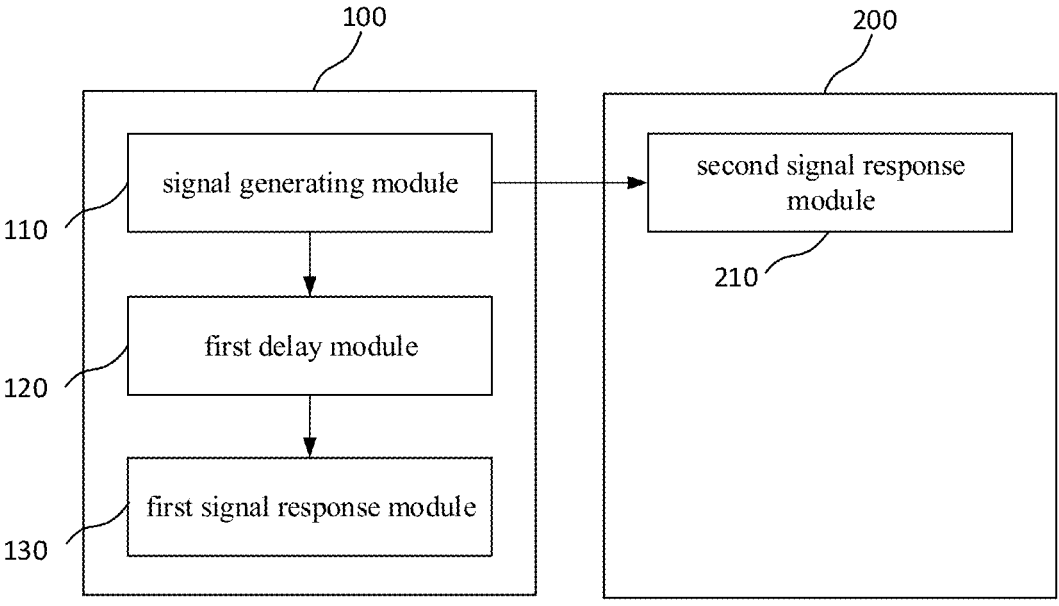
FIG. 1 shows a schematic diagram of a first chip provided in at least one embodiment of the present disclosure.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left"

and the like are only used to indicate relative position relationship, and when the position of the object which is described is changed, the relative position relationship may be changed accordingly.

According to research findings, a SYNCREQ (synchronization request)/SYNCACK (synchronization acknowledge) four-phase handshaking mechanism (four-phase handshaking protocol) is employed in an across-chip timestamp synchronization scheme. For example, when timestamp synchronization needs to be performed on two chips, it is necessary to perform multiple handshakes between the two chips, compute to obtain a transmission delay of SYNCREQ/SYNCACK handshaking signal between the chips, then send synchronization data (current timestamp data+data transmission delay+synchronization request signal transmission delay), then send a synchronization request to trigger a synchronization operation, and finally implement alignment of timestamp data. In the synchronization process of this scheme, multiple handshakes are required, the communication process is relatively long, and the implementation of functional control logic is relatively complicated, which is prone to design defects.

At least one embodiment of the present disclosure provides a first chip, a second chip, a chip system, and a timestamp synchronization method. The first chip is configured to be in communication connection to a second chip, and the first chip includes a signal generating module, a first signal response module, and a first delay module. The signal generating module is configured to generate a synchronization request signal and transmit the synchronization request signal to the first signal response module and the second chip, so that the second signal response module of the second chip records a second timestamp of the second chip in response to receiving the synchronization request signal; the first delay module is configured to perform delay processing on the synchronization request signal transmitted from the signal generating module to the first signal response module to obtain a delayed synchronization request signal; and the first signal response module is configured to record a first timestamp of the first chip in response to receiving the delayed synchronization request signal, in which the first timestamp and the second timestamp are used for performing a timestamp synchronization operation.

According to the above-mentioned embodiments of the present disclosure, considering that the synchronization request signal will be delayed for a period of time when transmitted from the first chip to the second chip, a corresponding delay is also made to the synchronization request signal within the first chip, so that times when the two chips capture the synchronization request signal (or delayed synchronization request signal) are almost the same. The two chips capture their respective timestamps in response to the synchronization request signal (or delayed synchronization request signal), and thus, times when the two chips capture the timestamps are also almost the same. In this way, a timestamp difference between the two chips can be determined according to a difference value between the timestamps of the two chips, and the timestamp synchronization operation can be directly performed directly according to the difference value between the timestamps, without performing multiple handshakes to compute the data transmission delay and the synchronization request signal transmission delay, thereby implementing an across-chip timestamp synchronization mode that is logically simple, functionally stable, and efficient.

For example, the first chip and the second chip of an embodiment of the present disclosure may each be a Die.

The Die may also be referred to as a wafer, a bare chip and the like. Multiple dies may be integrated into one package by a die-to-die (D2D) interconnection technology to form a more powerful chip. In an embodiment of the present disclosure, the first chip is configured to be in communication connection to the second chip. For example, the first chip and the second chip are in communication connection via D2D interconnection. Moreover, when one of the first chip and the second chip is described as a "chip", the other of the first chip and the second chip is described as "another chip".

For example, the first chip and the second chip each may be a processor Die, and multiple processor Dies may be interconnected to form a more powerful processor chip. The first chip and the second chip, for example, may be used for arithmetic operations and control, for processing image data, or for performing neural network computing. The above description is only an example and is not intended to limit the first chip and the second chip. In practical applications, the first chip and the second chip may also be other types of chips.

In some embodiments, clocks of multiple interconnected Dies may be generated by a same clock generator, namely that, the multiple interconnected Dies may share a clock source. In some other embodiments, the multiple interconnected Dies may also be provided with clock signals by multiple different clock generators. In this case, input clocks of some Dies may be of different sources. There may be inconsistencies in timestamp data between Dies with a same source of clocks and between Dies with different sources of clocks. Therefore, the timestamp synchronization operation may be performed.

FIG. 1 shows a schematic diagram of a first chip provided in at least one embodiment of the present disclosure.

As shown in FIG. 1, the first chip 100 includes a signal generating module 110, a first delay module 120, and a first signal response module 130.

The signal generating module 110 is configured to generate a synchronization request signal and transmit the synchronization request signal to the first signal response module 130 and a second chip 200, so that the second signal response module 210 of the second chip 200 records a second timestamp of the second chip 200 in response to receiving the synchronization request signal.

The first delay module 120 is configured to perform delay processing on the synchronization request signal transmitted from the signal generating module 110 to the first signal response module 130 to obtain a delayed synchronization request signal.

The first signal response module 130 is configured to record a first timestamp of the first chip 100 in response to receiving the delayed synchronization request signal, and the first timestamp and the second timestamp are used for performing a timestamp synchronization operation.

For example, after the signal generating module 110 generates a synchronization request signal, the synchronization request signal may be transmitted to both the first signal response module 130 internal to the first chip and the second chip 200 external to the first chip. The second chip 200 includes the second signal response module 210, and the first signal response module 130 and the second signal response module 210 may each immediately capture current timestamps of their respective chips in response to the synchronization request signal (or delayed synchronization request signal). For example, the second signal response module 210 may immediately capture a current timestamp of the second chip as the second timestamp in response to receiving the synchronization request signal from the first chip, and record the second timestamp in a register. The first signal response module 130 may also be configured to immediately capture a current timestamp of the first chip after receiving the synchronization request signal (or delayed synchronization request signal).

For example, because there is a certain delay in signal transmission between the first chip 100 and the second chip 200, and the delay is greater than a delay in signal transmission within the first chip 100, a duration of the synchronization request signal arriving at the second signal response module 210 of the second chip 200 is greater than a duration of arriving at the first signal response module 130, resulting in a great time difference between times when the first signal response module 130 and the second signal response module 210 capture the timestamps of their respective chips. The difference in the timestamps of the two chips captured in this case cannot represent a true time difference between the two chips, and there is a relatively big error. Therefore, the first delay module 120 may be provided between the signal generating module 110 and the first signal response module 130. The first delay module 120 may perform delay processing on the synchronization request signal during the transmission process from the signal generating module 110 to the first signal response module 130. The delay duration of the synchronization request signal may be determined by referring to the delay duration of transmitting the synchronization request signal between the first chip and the second chip.

Figure 2:
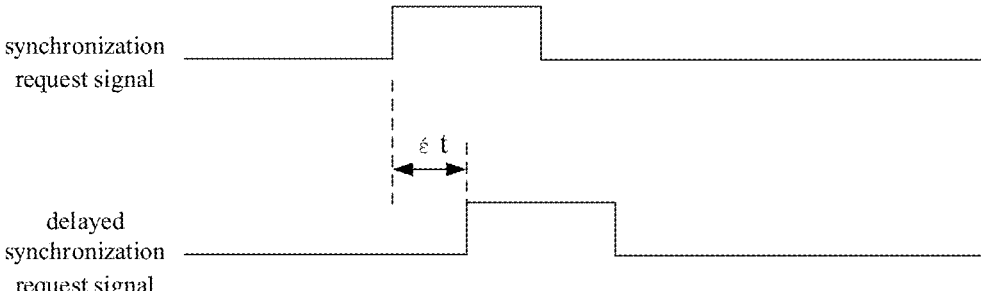
FIG. 2 shows a schematic diagram of a delay of a synchronization request signal provided in at least one embodiment of the present disclosure.

FIG. 2 shows a schematic diagram of a delay of a synchronization request signal provided in at least one embodiment of the present disclosure.

As shown in FIG. 2, the synchronization request signal has a posedge and a negedge. The synchronization request signal may be delayed by $\Delta t$ duration, that is, both the posedge and the negedge may be delayed synchronously by the $\Delta t$ duration to obtain a delayed synchronization request signal. The $\Delta t$ duration may be determined, for example, with reference to the delay duration of transmitting the synchronization request signal between the first chip and the second chip.

For example, the delayed synchronization request signal may be transmitted to the first signal response module 130, and the first signal response module 130 may immediately capture current timestamp data of the first chip as the first timestamp in response to the delayed synchronization request signal, and may record the first timestamp in a register.

For example, the first delay module 120 is configured to make a time difference between a time when the delayed synchronization request signal is responded to by the first signal response module 130 and a time when the synchronization request signal transmitted to the second chip is responded to by the second signal response module 210 less than a time difference threshold. Alternatively, a time difference between a time when the delayed synchronization request signal arrives at the first signal response module 130 and a time when the synchronization request signal transmitted to the second chip arrives at the second signal response module 210 is less than a time difference threshold. When the time difference between times when the first chip and the second chip receive or response to the synchronization request signal (or delayed synchronization request signal) is less than the time difference threshold, it may be indicated that the time difference is very small and may be ignored. The time difference threshold may be determined according to the actual situation.

For example, the time difference between the time when the delayed synchronization request signal arrives at the first signal response module 130 and the time when the synchronization request signal transmitted to the second chip arrives at the second signal response module 210 is shortened or eliminated, and the first signal response module 130 and the second signal response module 210 receive and response to the synchronization request signal (or delayed synchronization request signal) at nearly the same time, so that times when the first signal response module 130 and the second signal response module 210 capture the first timestamp and the second timestamp respectively are nearly the same or exactly the same. Therefore, a difference in timestamps between the first chip and the second chip may be determined based on the first timestamp and the second timestamp. For example, the difference value between the first timestamp and the second timestamp may be directly used as a true time difference between the two chips, and the error is relatively small and may be ignored. Therefore, a timestamp synchronization operation may be performed directly according to the time difference.

For example, the timestamp synchronization operation may include changing the timestamp count of the second chip or the timestamp count of the first chip according to the difference value between the first timestamp and the second timestamp, so that the timestamp counts of the first chip and the second chip are synchronized.

According to an embodiment of the present disclosure, considering that the synchronization request signal will be delayed for a period of time when transmitted from the first chip to the second chip, a corresponding delay is also made to the synchronization request signal within the first chip, so that times when the two chips capture the synchronization request signal (or delayed synchronization request signal) are almost the same. The two chips capture their respective timestamps in response to the synchronization request signal (or delayed synchronization request signal), and thus, times when the two chips capture the timestamps are also almost the same. In this way, a timestamp difference between the two chips can be determined according to a difference value between the timestamps of the two chips, and the timestamp synchronization operation can be directly performed directly according to the difference value between the timestamps, without performing multiple handshakes to compute the data transmission delay and the synchronization request signal transmission delay, thereby implementing an across-chip timestamp synchronization mode that is logically simple, functionally stable, and efficient.

For example, in some embodiments, the timestamp synchronization operation may be executed by the second chip. After capturing the second timestamp, the second chip may send a timestamp acquisition request to the first chip. The first signal response module may be further configured to send the first timestamp to the second chip in response to the timestamp acquisition request from the second chip, so that the second chip may perform the timestamp synchronization operation based on the first timestamp and the second timestamp.

For example, in some other embodiments, the timestamp synchronization operation may also be executed by the first chip. For example, after capturing the first timestamp, the first chip may send a timestamp acquisition request to the second chip to acquire the second timestamp, and then perform the timestamp synchronization operation according to the first timestamp and the second timestamp.

The following embodiments are illustrated with taking the second chip executing the timestamp synchronization operation as an example.

Figure 3:
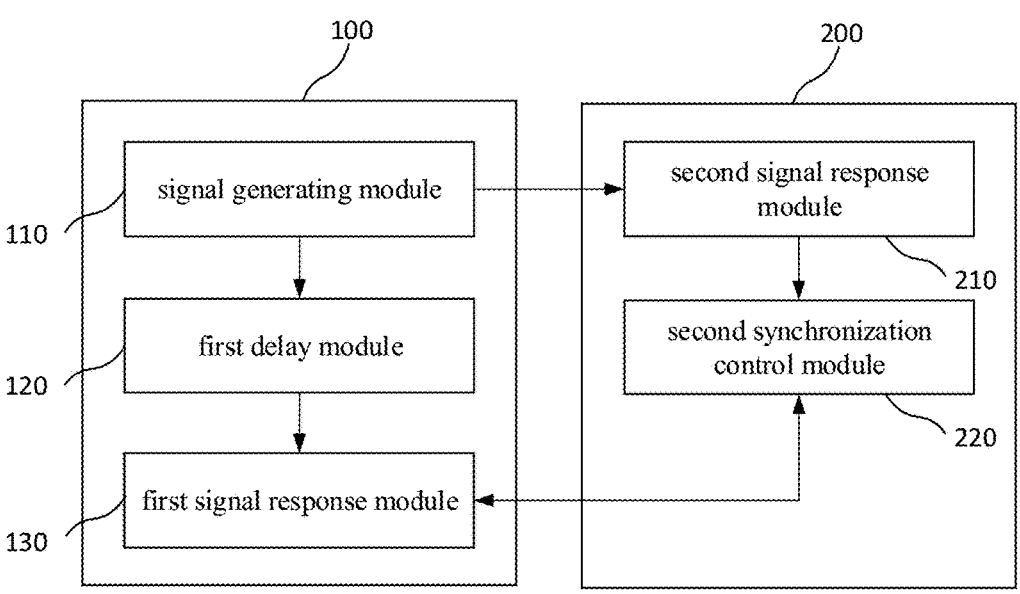
FIG. 3 shows a schematic diagram of a second chip provided in at least one embodiment of the present disclosure.

FIG. 3 shows a schematic diagram of a second chip provided in at least one embodiment of the present disclosure.

As shown in FIG. 3, the first chip 200 may include a second signal response module 210 and a second synchronization control module 220.

The second signal response module 210 is configured to record the second timestamp of the second chip 200 in response to receiving a synchronization request signal from the first chip 100, and transmit the synchronization request signal to the second synchronization control module 220.

The second signal response module 220 is configured to acquire a second timestamp from the second signal response module 210 and acquire a first timestamp from the first chip 100 in response to receiving the synchronization request signal, and execute the timestamp synchronization operation based on the first timestamp and the second timestamp. The first timestamp is a timestamp of the first chip 100 recorded by the first signal response module 130 of the first chip in response to a delayed synchronization request signal.

Figure 4:
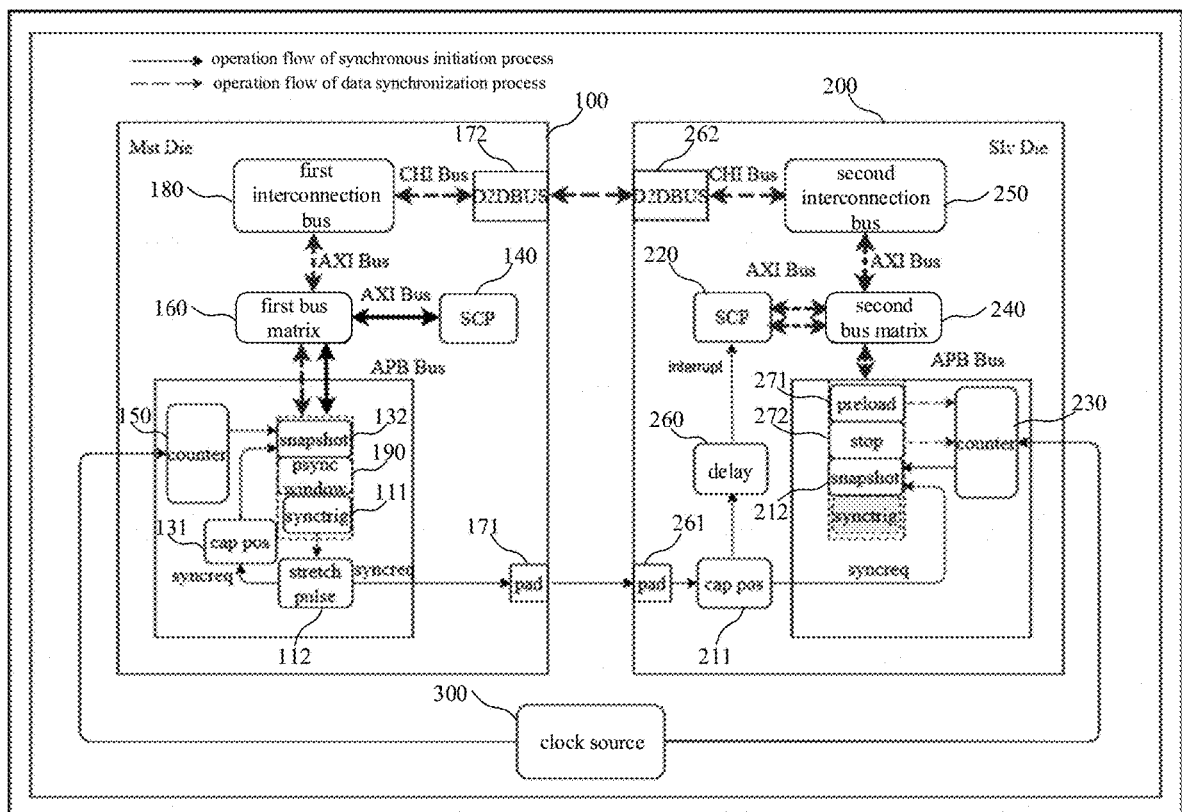
FIG. 4 shows a schematic diagram illustrating input clocks of a first chip and a second chip coming from a same source provided in at least one embodiment of the present disclosure.

FIG. 4 shows a schematic diagram illustrating input clocks of a first chip and a second chip coming from a same source provided in at least one embodiment of the present disclosure.

As shown in FIG. 4, the first chip 100 is, for example, a master die (Mst Die) illustrated, and the first chip 200 is, for example, a slave die (Slv Die) illustrated. The first chip 100 and the second chip 200 may share a same clock source 300, and a clock signal generated by the clock source 300 is transmitted to both the first chip 100 and the second chip 200, namely that, input clocks of the first chip 100 and the second chip 200 are of a same source. The following embodiments will describe the case where the input clocks of the first chip 100 and the second chip 200 are of the same source.

For example, the signal generating module 110 may include a synchronization signal trigger module 111 and a pulse stretch module 112. The synchronization signal trigger module 111 is configured to generate an initial pulse signal, and the pulse stretch module 112 is configured to perform a stretching operation on the initial pulse signal to obtain a stretched initial pulse signal. The stretched initial pulse signal may be used as a synchronization request signal.

For example, for the synchronization signal trigger module 111, refer to synctrig 111 shown in FIG. 4, in which synctrig is the abbreviation for synchronization trigger, which is used for implementing a one-time trigger synchronization function of software and a periodic trigger synchronization function of hardware. For the pulse stretch module 112, refer to stretch pulse 112 shown in FIG. 4, which is configured to stretch a pulse signal (i.e., the initial pulse signal) from the synctrig 111. The stretched signal may be used as the synchronization request signal (refer to syncreq shown in FIG. 4) to guarantee that the synchronization request signal transmitted to the second chip can be correctly captured.

Figure 5:
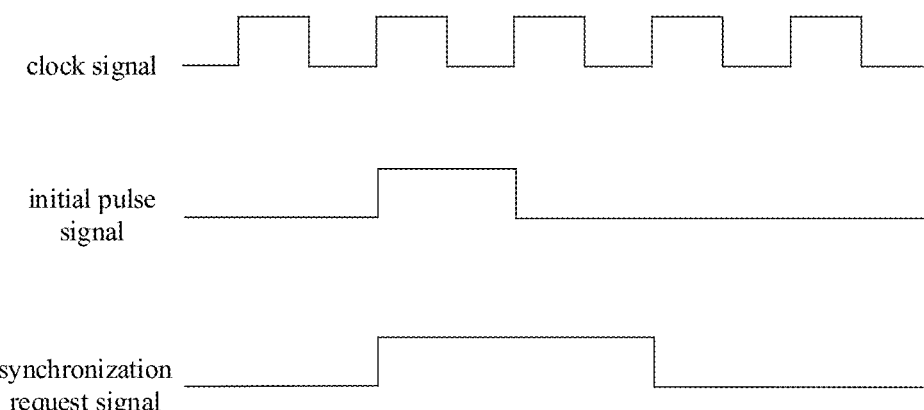
FIG. 5 shows a schematic diagram of an initial pulse signal and a synchronization request signal provided in at least one embodiment of the present disclosure.

FIG. 5 shows a schematic diagram of an initial pulse signal and a synchronization request signal provided in at least one embodiment of the present disclosure.

As shown in FIG. 5, the synchronization signal trigger module may generate an initial pulse signal on a posedge of a clock signal and transmit the initial pulse signal to the pulse stretch module. The pulse stretch module may stretch the initial pulse signal, for example, a pulse signal with one reference clock period width is stretched to a pulse signal with two reference clock period widths, and the stretched signal may be used as the synchronization request signal, which is convenient for the second chip to capture the synchronization request signal.

For example, the first chip 100 may further include a first synchronization control module 140. The first synchronization control module 140 is configured to control a signal generating module to generate the synchronization request signal. For the first synchronization control module 140, refer to SCP 140 shown in FIG. 4, in which SCP is the abbreviation of system control processor, and SCP 140 may be a control system including a small processor. A firmware program is run on SCP 140 to configure related registers in the first chip and control a synchronization process of the first chip. SCP 140 may control syncrig 111 with software to trigger the synchronization request once. For example, SCP 140 may write instructions to a register of synctrig 111 through a first bus matrix 160, triggering synctrig 111 to generate the initial pulse signal.

For example, the first signal response module 130 of the first chip 100 may include a first signal capture module 131 and a first recording module 132. The first signal capture module 131 is configured to receive a delayed synchronization request signal, and send a recording command to the first recording module in response to the delayed synchronization request signal. The first recording module is configured to record a current timestamp of the first chip 100 as the first timestamp in response to the recording command.

For example, for the first signal capture module, refer to cap pos 131 shown in FIG. 4, in which cap pos is the abbreviation of capture posedge. The capture posedge represents a signal posedge capture module, which is configured to capture a posedge of the delayed synchronization request signal. Once the posedge is captured, the first recording module 132 may be notified to capture the current timestamp. Furthermore, in other embodiments, the first signal capture module may also be configured to capture a negedge of the delayed synchronization request signal. For the first recording module, refer to snapshot 132 shown in FIG. 4, in which the snapshot represents a snapshot function register, which is configured to implement a snapshot function for timestamp data.

For example, the first chip may further include a first timestamp counter. The first timestamp counter is configured to continuously count at a fixed frequency, and the counted numerical value of the first timestamp counter may serve as the timestamp of the first chip. The first recording module is configured to capture the numerical value of the first timestamp counter to a register of the first recording module in a snapshot manner.

For example, for the first timestamp counter, refer to counter 150 shown in FIG. 4, in which the counter 150 is a timestamp counter, and may continuously count at a fixed frequency after the system is powered on and enabled, and thus the passage of system time can be characterized. After receiving a command to capture the timestamp data sent from cap pos 131 or other modules, snapshot 132 may capture current timestamp data of the counter 150 into the register.

For example, the second signal response module 210 of the second chip 200 may include a second signal capture module 211 and a second recording module 212. The second signal capture module 211 is configured to receive the synchronization request signal from the first chip, send a recording command to the second recording module 212 in response to the synchronization request signal, and transmit the synchronization request signal to the second synchronization control module 220. The second recording module 212 is configured to record a current timestamp of the second chip as the second timestamp in response to the recording command.

For example, for the second signal capture module 211, refer to cap pos 211 shown in FIG. 4, in which the second signal capture module 211 is configured to capture a posedge of the synchronization request signal. Once the posedge is captured, the second recording module may be notified to capture the current timestamp. Furthermore, in other embodiments, the second signal capture module 211 may also be configured to capture a negedge of the synchronization request signal. For the second recording module 212, refer to snapshot 212 shown in FIG. 4, in which the second recording module 212 is configured to implement a snapshot function for timestamp data.

For example, the second chip may further include a second timestamp counter 230. The second timestamp counter 230 is configured to continuously count at a fixed frequency, and the counted numerical value of the second timestamp counter 230 may be used as a timestamp of the second chip 200. The second recording module 212 is configured to capture the value of the second timestamp counter to a register of the second recording module in a snapshot manner.

For example, for the second timestamp counter 230, refer to counter 230 shown in FIG. 4, in which the counter 230 is a timestamp counter, and may continuously count at a fixed frequency after the system is powered on and enabled, and thus the passage of system time can be characterized. After receiving a command to capture the timestamp data sent from cap pos 211 or other modules, the snapshot 212 may capture current timestamp data (second timestamp) of the counter 230 into the register of the snapshot 212.

According to an embodiment of the present disclosure, in the first chip, a delayed synchronization request signal is captured by the first signal capture module, and the first recording module is notified to perform a snapshot operation on timestamp data of the first chip after capture. In the second chip, a synchronization request signal is captured by the second signal capture module, and the second recording module is notified to perform a snapshot operation on timestamp data of the second chip after capture. Based on this approach, the collection of the synchronization request signals (or delayed synchronization request signal) and the capture of the timestamp data are effectively implemented by simple hardware modules in the first chip and the second chip.

For example, after capturing the synchronization request signal transmitted by the first chip, the second signal capture module 211 may further transmit the synchronization request signal to the second synchronization control module 220. For the second synchronization control module 220, refer to SCP 220 shown in FIG. 4, in which SCP is the abbreviation of system control processor, and SCP 220 may be a control system including a small processor. A firmware program is run on SCP 220 to configure a related register in the second chip and control a synchronization process of the second chip.

For example, the second chip may further include a second delay module 260. The second delay module 260 is connected between the second signal capture module 211 and the second synchronization control module 220, and is configured to delay the synchronization request signal transmitted by the second signal capture module 211 to the second synchronization control module 220.

For example, for the second delay module 260, refer to delay 260 shown in FIG. 4, in which the second delay module 260 is configured to delay the synchronization request signal to be transmitted to the second synchronization control module 220, for example, one reference clock period is delayed to guarantee that when the second synchronization control module 220 starts reading register data of the second recording module 212, the second recording module 212 has captured current timestamp data of the second chip. The second delay module 260 delays the signal and then transmits the delayed signal to a control core interrupt interface of the second synchronization control module 220, triggering the second synchronization control module 220 to start an interrupt response program (software control). For example, after receiving the signal transmitted from the second delay module 260, the second synchronization control module 220 may access the register of the second recording module 212 via a second bus matrix 240 to acquire the second timestamp from the register. Moreover, the second synchronization control module 220 may further send a timestamp acquisition request to the first chip via the second bus matrix 240 and a second interconnection bus 250 and the like to acquire the first timestamp from the first chip.

For example, the first chip further includes a first synchronization interface module 171. The first synchronization interface module 171 is connected to the signal generating module, and is configured to transmit the synchronization request signal to a second synchronization interface module 261 of the second chip. The first synchronization interface module 171 is an exclusive transmission interface for the synchronization request signal. For example, the first synchronization interface module 171 is connected to the pulse stretch module 112. After obtaining the synchronization request signal, the pulse stretch module 112 transmits the synchronization request signal to the first synchronization interface module 171 so as to transmit the synchronization request signal to the second chip by the first synchronization interface module 171.

For example, the second chip includes a second synchronization interface module 261. The second synchronization interface module 261 is connected to the second signal capture module 211, and is configured to receive the synchronization request signal transmitted from the first chip 100, and transmit the synchronization request signal to the second signal capture module 211, in which the second synchronization interface module 261 is an exclusive transmission interface for the synchronization request signal.

For example, the first synchronization interface module 171 and the second synchronization interface module 261 are in communication connection. For the first synchronization interface module 170, refer to pad (chip port solder joint) 171 shown in FIG. 4. For the second synchronization interface module 261, refer to pad (chip port solder joint) 261 shown in FIG. 4. The first synchronization interface module 171 and the second synchronization interface module 261 are configured to provide a data path for cross chip transmission of the synchronization request signal. The first synchronization interface module 171 and the second synchronization interface module 261 are exclusive interfaces for the synchronization request signal, that is, they only transmit the synchronization request signal, thereby implementing an exclusive transmission channel for the synchronization request signal. The synchronization request signal does not need to compete with other signals for bandwidth, and thus, the transmission rate is relatively high, and the transmission delay of transmitting the synchronization request signal from the first chip to the second chip each time can be made relatively fixed, making it convenient to delay the synchronization request signal transmitted inside the first chip accordingly. For example, the synchronization request signal to be transmitted to the first signal response module may be delayed correspondingly according to the transmission delay from the first synchronization interface module 171 to the second synchronization interface module 261, so that times when the first signal response module and the second signal response module receive the synchronization request signal (or delayed synchronization request signal) are closer.

For example, the first chip may further include a first data interface module 172. The first data interface module 172 is connected to the first signal response module, and is configured to send the first timestamp to the second data interface module of the second chip.

For example, for the first data interface module 172, refer to a die-to-die bus (D2DBUS) 172 shown in FIG. 4, in which D2DBUS 172 is a bus module for transmitting data across chips, and is configured to transmit and receive data streams across chips, thereby implementing the transmission of data across chips. Because the volume of the data transmitted by the first data interface module 172 is relatively large, while the first synchronization interface module is configured to transmit the synchronization request signal with a relatively small volume of data, the bandwidth of the first data interface module 172 may be greater than that of the first synchronization interface module 171.

For example, the first chip may further include a first interconnection bus 180. The first interconnection bus 180 is configured to connect the first signal response module and the first data interface module. The first chip may further include a first bus matrix 160, and the first data interface module 172 is connected to the first recording module 132 via the first interconnection bus 180 and the first bus matrix 160. The first interconnection bus 180 is configured to provide a system-level data access path and perform bus protocol conversion. The first bus matrix 160 is configured to provide an access path of modules such as the first synchronization control module 140 to modules such as the first recording module 132, the synchronization signal trigger module 111 and a period module, and perform the bus protocol conversion.

For example, the second chip may further include a second data interface module 262. The second data interface module 262 is connected to the second synchronization control module 220, and is configured to receive the first timestamp sent by the first chip 100 and send the first timestamp to the second synchronization control module 220.

For example, for the second data interface module 262, refer to D2DBUS 262 shown in FIG. 4, and the bandwidth of the second data interface module 262 may be greater than that of the second synchronization interface module 261.

For example, the second chip may further include a second interconnection bus 250. The second interconnection bus 250 is configured to connect the second synchronization control module 220 and the second data interface module 262. The second chip may further include a second bus matrix 240, and the second data interface module 262 is connected to the second synchronization control module 220 via the second interconnection bus 250 and the first bus matrix 240. The second interconnection bus 250 is configured to provide a system-level data access path and perform bus protocol conversion. The second bus matrix 240 is configured to provide an access path of modules such as the second synchronization control module 220 to modules such as the second recording module 212, a first synchronization module 271 and a second synchronization module 272, and perform the bus protocol conversion.

For example, after receiving the signal from the second delay module 260, the second synchronization control module 220 first accesses the register of the second recording module 212 via the second bus matrix 240 to acquire second timestamp data, and then accesses the register of the first recording module 132 by path from the second bus matrix 240 to the second interconnection bus 250 to the second data interface module 262 to the first data interface module 172 to the first interconnection bus 180 to the first bus matrix 160 to acquire the data of the first timestamp.

For example, the second synchronization control module 220 may be further configured to: in a case where the first timestamp is greater than the second timestamp, compute to obtain an absolute difference value between the first time-stamp and the second timestamp as a first absolute difference, and update the numerical value of the second time-stamp counter based on the first absolute difference value; and in a case where the first timestamp is less than the second timestamp, compute to obtain an absolute difference value between the first timestamp and the second timestamp as a second absolute difference, and control the second timestamp counter to stop (pause) counting until a duration of stopping counting reaches a duration corresponding to the second absolute difference value, that is, after the duration corresponding to the second absolute difference value from the time when counting is stopped, the second timestamp counter is controlled to continue counting.

For example, the second chip may further include a first synchronization module 271 and a second synchronization module 272. The first synchronization module 271 and the second synchronization module 272 are connected to the second synchronization control module 220 via the second bus matrix 240. For the first synchronization module 271, refer to preload 271 shown in FIG. 4, and for the second synchronization module 272, refer to stop 272 shown in FIG. 4. The first synchronization module 271 is suitable for scenarios where the first timestamp is greater than the second timestamp and may be used in conjunction with software to update the data of the second timestamp counter 230. The second synchronization module 272 is suitable for scenarios where the first timestamp is less than the second timestamp and may be used in conjunction with software to control the second timestamp counter 230 to stop counting.

For example, in a case where the first timestamp is greater than the second timestamp, after working out the first absolute difference value, the second synchronization control module 220 may write the first absolute difference value to the register of the first synchronization module 271. The first synchronization module 271 is configured to trigger a numerical value update operation in response to the first absolute difference value being written by the second synchronization control module to update the numerical value of the second timestamp counter based on the first absolute difference value. In a case where the first timestamp is less than the second timestamp, after working out the second absolute difference value, the second synchronization control module 220 may write the second absolute difference value to the register of the second synchronization module 272. The second synchronization module 272 is configured to trigger a stop counting operation in response to the second absolute difference value being written by the second synchronization control module, to make the second timestamp counter stop counting until the duration of stopping counting reaches the duration corresponding to the second absolute difference value.

For example, after acquiring the first timestamp and the second timestamp, the second synchronization control module 220 compares numerical values of the first timestamp and the second timestamp and compute the absolute difference value between the first timestamp and the second timestamp. If the numerical value of the first timestamp is greater than that of the second timestamp, the second synchronization control module 220 may write the absolute difference value to the register of the first synchronization module 271. When it is detected that the absolute difference value is written in the first synchronization module 271, a data update of the second timestamp counter 230 is triggered at a posedge of a reference clock by hardware control to update the numerical value of the second timestamp counter 230 to Tslave=Tcurr+1'b1+Tdiff, in which Tslave represents an updated numerical value, Tcurr represents a current numerical value of the second timestamp counter 230, Tdiff represents the absolute difference value between the first timestamp and the second timestamp, and 1'b1 represents one clock period. Because there may be a delay of one clock period between capturing the current numerical value of the second timestamp counter 230 and updating the numerical value of the second timestamp counter 230, 1'b1 may be used for compensate for this delay. If the numerical value of the first timestamp is less than that of the second timestamp, the second synchronization control module 220 may write the absolute difference value to the register of the second synchronization module 272. When it is detected that the absolute difference value is written to the second synchronization module 272, the second timestamp counter 230 is paused by hardware control for Tdiff reference clock periods before continuing counting.

Figure 6:
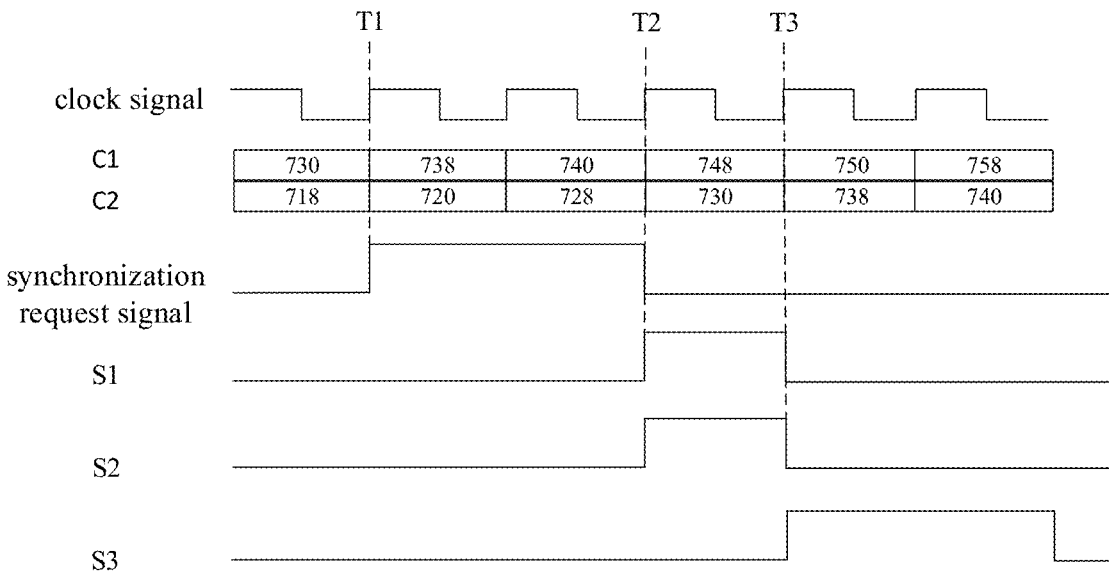
FIG. 6 shows a schematic diagram illustrating a synchronization request signal being generated and captured provided in at least one embodiment of the present disclosure.

FIG. 6 shows a schematic diagram illustrating a synchronization request signal being generated and captured provided in at least one embodiment of the present disclosure.

As shown in FIG. 6, C1 represents the numerical value of the first timestamp counter 150, C2 represents the numerical value of the second timestamp counter 230, S1 represents a delayed synchronization request signal captured by the first signal capture module 131, S2 represents a synchronization request signal captured by the second signal capture module 211, and S3 represents a signal transmitted by the second delay module 260 to the first synchronization control module 220 after performing a signal delay.

For example, the numerical value of the first timestamp counter and the numerical value of the second timestamp counter both vary with the clock period. The numerical value of the first timestamp counter and the numerical value of the second timestamp counter increase by a predetermined value every clock period. For example, the numerical value increases by 8 in each clock period, and the count is hexadecimal. The numerical value of the first timestamp counter shown in FIG. 6 differs from the numerical value of the second timestamp counter by 3 clock periods.

For example, at a time point T1, the signal generating module generates a synchronization request signal. At a time point T2, both the first signal capture module 131 and the second signal capture module 211 capture the synchronization request signal (or delayed synchronization request signal), and trigger the capture of the timestamps of their respective chips. For example, the first recording module 132 captures the first timestamp of 748, and the second recording module 212 captures the second timestamp of 730, and there is a difference of 3 clock periods between 748 and 730. At a time point T3, the second delay module 260 delays the synchronization request signal captured by the second signal capture module 211 to obtain a delayed signal, which will be sent to the first synchronization control module 220.

Figure 7:
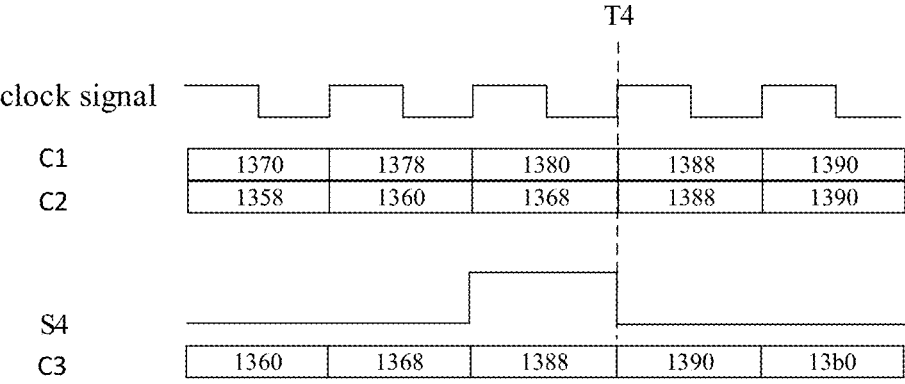
FIG. 7 shows a schematic diagram illustrating updating a second timestamp counter numerical value provided in at least one embodiment of the present disclosure.

FIG. 7 shows a schematic diagram illustrating updating a second timestamp counter numerical value provided in at least one embodiment of the present disclosure.

As shown in FIG. 7, C1 represents a numerical value of the first timestamp counter 150, C2 represents a numerical value of the second timestamp counter 230, C3 represents a numerical value that the second timestamp counter needs to be updated to, and S4 represents a signal (i.e., an enable signal for an update operation) that triggers the second timestamp counter to update its numerical value.

For example, for a case where the numerical value of the first timestamp is greater than that of the second timestamp, a value that the second timestamp counter needs to be updated to may be computed according to the absolute difference value between the first timestamp and the second timestamp. For example, the absolute difference value between the first timestamp and the second timestamp is 3 clock periods, and in a case where the current numerical value of the second timestamp counter is 1368, then 3 clock periods are added to 1368 to make 1380, and then another clock period is added to make 1388. At a time point T4, a numerical value update operation is triggered to update the numerical value of the second timestamp counter to 1388, and the updated numerical value is consistent with that of the first timestamp counter.

Figure 8:
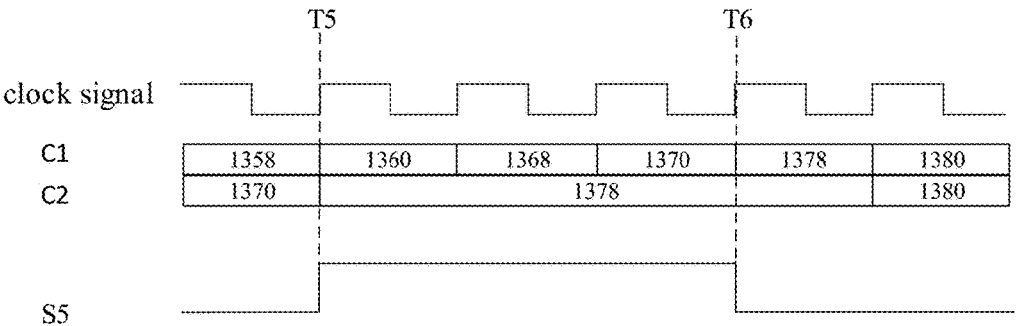
FIG. 8 shows a schematic diagram illustrating stopping a second timestamp counter from counting provided in at least one embodiment of the present disclosure.

FIG. 8 shows a schematic diagram illustrating stopping a second timestamp counter from counting provided in at least one embodiment of the present disclosure.

As shown in FIG. 8, C1 represents a numerical value of the first timestamp counter 150, C2 represents a numerical value of the second timestamp counter 230, and S5 represents a signal for controlling the second timestamp counter to pause counting.

For example, for a case where the numerical value of the first timestamp is less than that of the second timestamp, the number of clock periods that the second timestamp counter needs to pause counting may be determined. For example, the absolute difference value between the first timestamp and the second timestamp is 3 clock periods, the current numerical value of the second timestamp counter is, for example, 1370, and the current numerical value of the first timestamp counter is, for example, 1358. At a time point T5, with the arrival of the posedge of the clock signal, the numerical value of the first timestamp counter and the numerical value of the second timestamp counter increase by 8 (one clock period), the numerical value of the second timestamp counter becomes 1378, and the numerical value of the first timestamp counter becomes 1360. Because the signal S5 is triggered at the time point T5, the second timestamp counter stops counting, the numerical value stays at 1378, and the first timestamp counter can continue counting. After three clock periods, the signal S5 ends, and the first timestamp counter can start counting. With the arrival of a posedge of the next clock signal, the numerical value of the first timestamp counter increases by 8 to rise to 1380. At this time, the numerical value of the first timestamp counter also rises to 1380, and the numerical value of the first timestamp counter and the numerical value of the second timestamp counter become consistent.

It should be noted that FIGS. 6 to 8 are relatively ideal cases, but there may be some deviations in practical applications.

Figure 9:
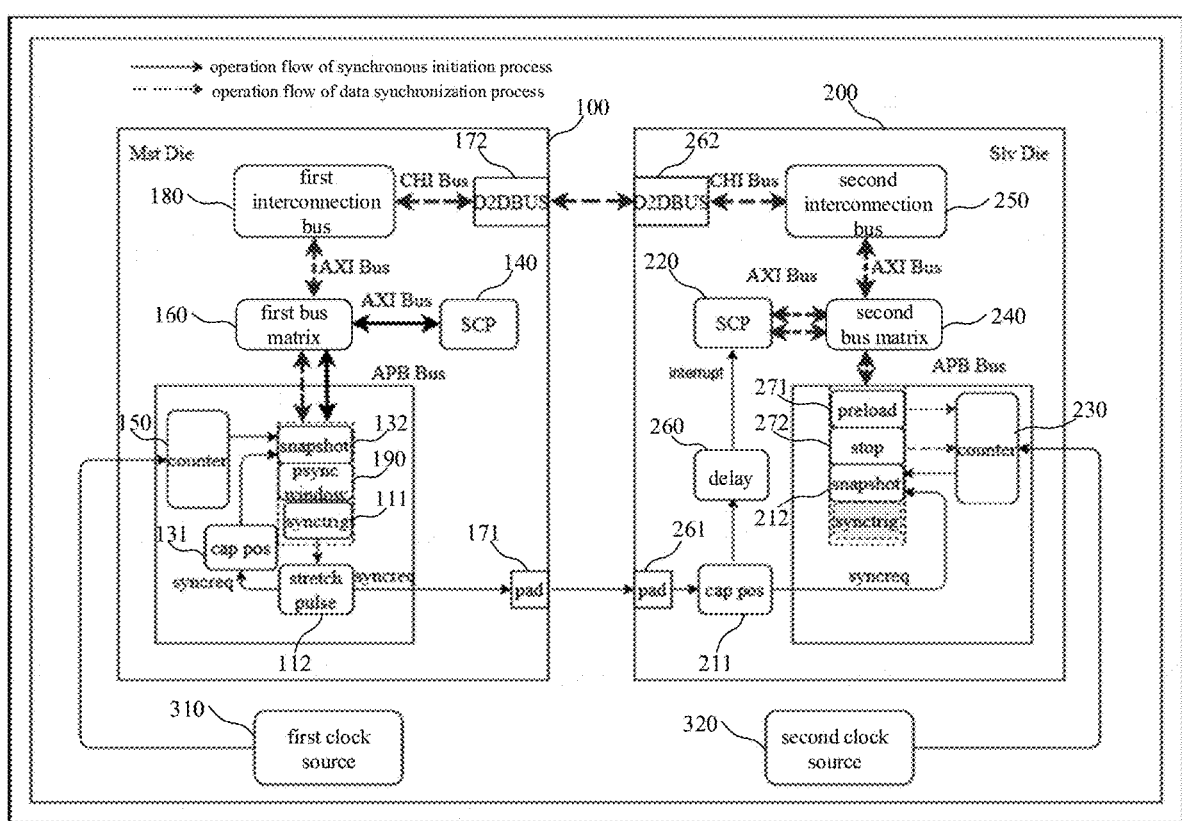
FIG. 9 shows a schematic diagram illustrating input clocks of a first chip and a second chip coming from different sources provided in at least one embodiment of the present disclosure.

FIG. 9 shows a schematic diagram illustrating input clocks of a first chip and a second chip coming from different sources provided in at least one embodiment of the present disclosure.

As shown in FIG. 9, the first chip and the second chip are connected to different clock sources. For example, the first chip receives a clock signal from a first clock source 310, and the second chip receives a clock signal from a second clock source 320.

Because a difference in timestamp data of multiple chips of a same source of clock is less than a difference in timestamp data of multiple chips of different sources of clocks, for a first chip and a second chip of the same source of clock, a user may trigger the synchronization request once or multiple times (software control) by the first synchronization control module 140 according to needs. For a first chip and a second chip of different sources of clocks, it is easy to leads to long-term data deviation between the first chip and the second chip. After a synchronization operation is executed, there may be a timestamp difference after a period of time. Therefore, an embodiment of the present disclosure further provides a periodic synchronization operation.

For example, in addition to the various modules mentioned in the above embodiments, the first chip may further include a period module 190. The period module 190 is configured to record a synchronization period. The signal generating module is further configured to generate the synchronization request signal once every synchronization period to trigger the timestamp synchronization operation in a case where a periodic synchronization function is enabled.

For example, for the period module 190, refer to psync window 190 shown in FIG. 4, in which psync window is the abbreviation for period synchronization window, and the period module 190 is a time window register for timestamp period synchronization. By configuring the register, a period synchronization function of a specified time window can be implemented. The period synchronization may be enabled by software control, and period trigger may be enabled by hardware control. For example, if the numerical value of the period is written in the register of the period module 190, it indicates that the periodic synchronization function is enabled. The synchronization signal trigger module may set a timing counter, and whenever the count duration reaches the duration of the synchronization period, the synchronization request is triggered once. For example, whenever the count duration reaches the duration of the synchronization period, the synchronization signal trigger module may generate an initial pulse signal once. After the initial pulse signal is stretched, a synchronization request signal is obtained. The synchronization request signal is transmitted to the second signal capture module in the second chip, and the synchronization request signal is delayed and then the delayed synchronization request signal is transmitted to the first signal capture module in the first chip. The first signal capture module and the second signal capture module notify the first recording module and the second recording module respectively to record the current timestamp numerical values of their respective chips, and then the timestamp synchronization operation is performed according to the difference value between the timestamp numerical values of the two chips. For details, refer to the related descriptions above, which will not be repeated here. The numerical value of the duration of the synchronization period may be determined according to the actual situation, for example, it may be 1 millisecond. By configuring time data (the time data may be configured by software) such as 1 millisecond to the register, the system will initiate the timestamp synchronization operation once every corresponding time (e.g., 1 millisecond). The period synchronization can address the problem of the long-term data deviation between the chips caused by clocks of different sources.

For example, FIGS. 4 and 9 only show the modules of the first chip and the second chip used in the timestamp synchronization process of the above-mentioned embodiments. However, the modules included in the first chip and the second chip and functions of the modules may be the same. For example, the second chip may also include a signal trigger module, a first delay module and the like, and the first chip may also include a first synchronization module, a second synchronization module and the like. The functions of corresponding modules in the first chip and the second chip may be the same. For example, the second synchronization control module may also have the above-mentioned functions of the first synchronization control module, and the first synchronization control module may also have the above-mentioned functions of the second synchronization control module.

For example, the roles of the first chip and the second chip are interchangeable. For example, the synchronization request signal may be generated by the second chip, and then transmitted to the first signal response module in the first chip and second signal response module in the second chip, and the timestamp synchronization operation is executed by the first chip.

For example, the first chip may perform timestamp synchronization with other chips in addition to performing timestamp synchronization with the second chip. Similarly, the second chip may also perform timestamp synchronization with other chips.

According to an embodiment of the present disclosure, a simple and effective timestamp synchronization circuit is implemented by cooperative operations between various functional modules. The timestamp synchronization circuit can be responsible for responding to the synchronization request signal, capturing the timestamp data, and executing the synchronization operation, and thus, the fast synchronization of the first chip and the second chip is implemented with simple circuit logic.

According to an embodiment of the present disclosure, the control way in which software and hardware cooperate with each other is employed, which reduces the complexity of hardware design, and improves the flexibility of synchronous process control. For example, operations implemented by the hardware control may include: the operation of stretching the initial pulse signal, the operation of capturing the synchronization request signal (or delayed synchronization request signal) by the first signal capture module and the second signal capture module, the operation of acquiring the timestamps from corresponding timestamp counters by the first recording module and the second recording module, the operation of delaying the synchronization request signal and so on. Operations implemented by the software control may include: the operation of the second synchronization control module accessing the second recording module to read the second timestamp, the operation of the second synchronization control module accessing the first recording module to read the first timestamp, and so on.

According to an embodiment of the present disclosure, the first synchronization module and the second synchronization module cooperate with the software, which implement update and pause functions of the second timestamp counter, and enhances the adaptability to different synchronization scenarios.

At least one embodiment of the present disclosure further provides a chip system. The chip system includes a first chip and a second chip. For the first chip and the second chip, refer to FIGS. 1 to 9 and the descriptions regarding the corresponding contents in the above-mentioned embodiments, which will not be repeated here.

For example, in addition to the first chip and the second chip, the chip system may include other chips that require to perform the timestamp synchronization operation with the first chip and/or second chip.

At least one embodiment of the present disclosure further provides a timestamp synchronization method for a first chip.

FIG. 10 shows a flowchart of a timestamp synchronization method for a first chip provided in at least one embodiment of the present disclosure.

As shown in FIG. 10, the method may include steps S110 to S140.

Step S110: generating a synchronization request signal.

Step S120: transmitting the synchronization request signal to a second chip, so that the second chip records a second timestamp of the second chip in response to the synchronization request signal.

Step S130: performing delay processing on the synchronization request signal to obtain a delayed synchronization request signal.

Step S140: recording a first timestamp of the first chip in response to the delayed synchronization request signal, in which the first timestamp and the second timestamp are used for a timestamp synchronization operation.

For example, in step S110, an initial pulse signal may be generated, and a stretching operation is performed on the initial pulse signal, and a stretched initial pulse signal serves as the synchronization request signal. For example, the initial pulse signal may be generated by a synchronization signal trigger module, and the stretching operation is performed on the initial pulse signal by a pulse stretch module, and the stretched initial pulse signal serves as the synchronization request signal.

For example, the first chip includes a first synchronization interface module, and the first synchronization interface module is an exclusive interface for the synchronization request signal. In step S120, the synchronization request signal may be transmitted to the second chip by the first synchronization interface module. In the second chip, the synchronization request signal may be responded to by the second signal response module of the second chip to record the second timestamp of the second chip.

For example, the first chip includes a first signal response module. In step S140, the first signal response module may capture the delayed synchronization request signal, and record the first timestamp of the first chip in response to the delayed synchronization request signal.

For example, in step S130, delay processing is performed on the synchronization request signal, so that a time difference between a time when the delayed synchronization request signal is responded to by the first signal response module and a time when the synchronization request signal transmitted to the second chip is responded to by the second signal response module is less than a time difference threshold.

For example, the timestamp synchronization method for the first chip may further includes: sending the first timestamp to the second chip in response to a timestamp acquisition request from the second chip, so that the second chip performs the timestamp synchronization operation based on the first timestamp and the second timestamp.

For example, the first chip may further include a first data interface module, and the first timestamp may be sent by the first data interface module to a second data interface module of the second chip.

For example, the first signal response module includes a first signal capture module and a first recording module. In step S140, the first signal capture module may receive the delayed synchronization request signal, and send a recording command to the first recording module in response to the delayed synchronization request signal. Then, the first recording module records a current timestamp of the first chip as the first timestamp in response to the recording command.

For example, the first chip may further include a first timestamp counter. The first timestamp counter may continuously count at a fixed frequency, and a counted numerical value of the first timestamp counter serves as a timestamp of the first chip. In step S140, the first recording module may capture the numerical value of the first timestamp counter to a register of the first recording module in a snapshot manner.

For example, the first chip may further include a first synchronization control module. In step S110, the first synchronization control module may control the signal generating module to generate the synchronization request signal.

For example, the timestamp synchronization method for the first chip may further include: in a case where a period synchronization function is enabled, generating the synchronization request signal once every synchronization period to trigger the timestamp synchronization operation once.

For example, for the timestamp synchronization method for the first chip, refer to the related descriptions regarding the first chip in the above-mentioned embodiments for details, which will not be repeated here.

At least one embodiment of the present disclosure further provides a timestamp synchronization method for a second chip.

FIG. 11 shows a flowchart of a timestamp synchronization method for a second chip provided in at least one embodiment of the present disclosure.

As shown in FIG. 11, the method may include steps S210 to S230.

Step S210: recording a second timestamp of the second chip in response to receiving a synchronization request signal from a first chip.

Step S220: acquiring a first timestamp from the first chip, in which the first timestamp is a timestamp of the first chip recorded by the first chip in response to a delayed synchronization request signal.

Step S230: executing a timestamp synchronization operation based on the first timestamp and the second timestamp.

For example, the second chip includes a second signal response module. In step S210, the second signal response module records the second timestamp of the second chip in response to receiving the synchronization request signal from the first chip, and transmits the synchronization request signal to the second synchronization control module.

For example, a time difference between a time when the delayed synchronization request signal is responded to by a first signal response module in the first chip and a time when the synchronization request signal by a second signal response module is less than a time difference threshold.

For example, the second signal response module includes a second signal capture module and a second recording module. In step S210, the second signal capture module may receive the synchronization request signal from the first chip, send a recording command to the second recording module in response to the synchronization request signal, and transmit the synchronization request signal to the second synchronization control module. The second recording module records a current timestamp of the second chip as the second timestamp in response to the recording command.

For example, the second chip includes a second timestamp counter. The second timestamp counter continuously counts at a fixed frequency, and the counted numerical value of the second timestamp counter serves as a timestamp of the second chip. In step S210, the second recording module may capture the value of the second timestamp counter to a register of the second recording module in a snapshot manner.

For example, the second chip includes a second synchronization control module. In step S220, the second synchronization control module acquires the second timestamp from the second signal response module in response to receiving the synchronization request signal. In step S230, the second synchronization control module acquires the first timestamp from the first chip and executes the timestamp synchronization operation based on the first timestamp and the second timestamp.

For example, the timestamp synchronization method for the second chip may further include: delaying the synchronization request signal transmitted by the second signal capture module to the second synchronization control module.

For example, in step S230, in a case where the first timestamp is greater than the second timestamp, an absolute difference value between the first timestamp and the second timestamp is computed as a first absolute difference, and a numerical value update of the second timestamp counter is controlled based on the first absolute difference value; and in a case where the first timestamp is less than the second timestamp, an absolute difference value between the first timestamp and the second timestamp is computed as a second absolute difference, and the second timestamp counter is controlled to stop counting for duration corresponding to the second absolute difference value.

For example, the second chip includes a second synchronization interface module, and the second synchronization interface module is an exclusive interface for the synchronization request signal. In step S210, the second signal response module receives the synchronization request signal from the second synchronization interface module.

For example, for the timestamp synchronization method for the second chip, refer to the related descriptions regarding the second chip in the above-mentioned embodiments for details, which will not be repeated here.

For example, the various modules and devices mentioned in the embodiments of the present disclosure may be implemented by hardware (e.g., circuits), software, or any combination thereof. It should be noted that the components and structures of the first chip and the second chip shown in FIGS. 4 and 9 are only exemplary and not restrictive. As desired, the first chip and the second chip may also have other components and structures.

The above description is only the explanation of a partial embodiment of the present disclosure and the used technical principle. It should be understood by those skilled in the art that the disclosure scope involved in the disclosure is not limited to the technical solution formed by the specific combination of the above technical features, but also covers other technical solutions formed by any combination of the above technical features or their equivalent features without departing from the above disclosed concept. For example, the technical solution formed by replacing the above features with (but not limited to) technical features with similar functions disclosed in the disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of a single embodiment may also be implemented in a plurality of embodiments alone or in any suitable subcombination.

Although the subject matter has been described in language specific to structural features and/or logical actions of methods, it should be understood that the subject matter defined in the appended claims is not necessarily limited to the specific features or actions described above. On the contrary, the specific features and actions described above are only example forms of realizing the claims.

For the present disclosure, the following statements should be noted:

(1) The drawings involve only the structure(s) in connection with the embodiment(s) of the present disclosure, and other structure(s) can be referred to common design(s).

(2) In case of no conflict, features in one embodiment or in different embodiments can be combined to obtain new embodiments.

What have been described above are only specific implementations of the present disclosure, the protection scope of the present disclosure is not limited thereto, and the protection scope of the present disclosure should be based on the protection scope of the claims.

The invention claimed is:

1. A chip configured to be in communication connection to another chip, comprising a signal generating circuit, a first signal response circuit and a first delay circuit, wherein the signal generating circuit is configured to generate a synchronization request signal and transmit the synchronization request signal to the first signal response circuit and the another chip, so that a second signal response circuit of the another chip records a second timestamp of the another chip in response to receiving the synchronization request signal;

the first delay circuit is configured to perform delay processing on the synchronization request signal transmitted from the signal generating circuit to the first signal response circuit to obtain a delayed synchronization request signal; and the first signal response circuit is configured to record a first timestamp of the chip in response to receiving the delayed synchronization request signal, wherein the first timestamp and the second timestamp are used for performing an across-chip timestamp synchronization operation, wherein the first delay circuit is configured to make a time difference between a time when the delayed synchronization request signal is responded to by the first signal response circuit and a time when the synchronization request signal is responded to by the second signal response circuit less than a time difference threshold.

2. The chip according to claim 1, wherein the first signal response circuit is further configured to send the first timestamp to the another chip in response to a timestamp acquisition request from the another chip, so that the another chip performs the across-chip timestamp synchronization operation based on the first timestamp and the second timestamp.

3. The chip according to claim 1, wherein the first signal response circuit comprises a first signal capture circuit and a first recording circuit, wherein the first signal capture circuit is configured to receive the delayed synchronization request signal and send a recording command to the first recording circuit in response to the delayed synchronization request signal; and the first recording circuit is configured to record a current timestamp of the chip as the first timestamp in response to the recording command.

4. The chip according to claim 1, wherein the signal generating circuit comprises:

a synchronization signal trigger circuit configured to generate an initial pulse signal; and a pulse stretch circuit configured to perform a stretching operation on the initial pulse signal to obtain a stretched initial pulse signal, and use the stretched initial pulse signal serving as the synchronization request signal.

5. The chip according to claim 1, further comprising:

a first synchronization interface circuit, connected to the signal generating circuit, and configured to transmit the synchronization request signal to a second synchronization interface circuit of the another chip, wherein the first synchronization interface circuit is an exclusive transmission interface for the synchronization request signal.

6. The chip according to claim 2, further comprising:

a first data interface circuit connected to the first signal response circuit and configured to send the first timestamp to a second data interface circuit of the another chip; and a first interconnection bus configured to connect the first signal response circuit and the first data interface circuit.

7. The chip according to claim 3, further comprising:

a first timestamp counter configured to continuously count at a fixed frequency, wherein a counted numerical value of the first timestamp counter serves as a timestamp of the chip;

wherein the first recording circuit is configured to capture the numerical value of the first timestamp counter to a register of the first recording circuit in a snapshot manner.

8. The chip according to claim 1, further comprising:

a first synchronization control circuit configured to control the signal generating circuit to generate the synchronization request signal; and a period circuit, configured to record a synchronization period;

wherein the signal generating circuit is further configured to generate the synchronization request signal once every synchronization period to trigger the across-chip timestamp synchronization operation once in a case where a periodic synchronization function is enabled.

9. A chip configured to be in communication connection to another chip, comprising: a second signal response circuit and a second synchronization control circuit, wherein the second signal response circuit is configured to record a second timestamp of the chip in response to receiving a synchronization request signal from the another chip, and transmit the synchronization request signal to the second synchronization control circuit; and the second synchronization control circuit is configured to, in response to receiving the synchronization request signal, acquire the second timestamp from the second signal response circuit, and acquire a first timestamp from the another chip, and execute an across-chip timestamp synchronization operation based on the first timestamp and the second timestamp;

wherein the first timestamp is a timestamp of the another chip recorded by a first signal response circuit of the another chip in response to a delayed synchronization request signal, wherein a time difference between a time when the delayed synchronization request signal is responded to by the first signal response circuit and a time when the synchronization request signal is responded to by the second signal response circuit is less than a time difference threshold.

10. The chip according to claim 9, wherein the second signal response circuit comprises a second signal capture circuit and a second recording circuit, wherein the second signal capture circuit is configured to receive the synchronization request signal from the another chip, send a recording command to the second recording circuit in response to the synchronization request signal, and transmit the synchronization request signal to the second synchronization control circuit; and the second recording circuit is configured to record a current timestamp of the chip as the second timestamp in response to the recording command.

11. The chip according to claim 10, further comprising:

a second delay circuit, connected between the second signal capture circuit and the second synchronization control circuit, and configured to delay the synchronization request signal transmitted from the second signal capture circuit to the second synchronization control circuit.

12. The chip according to claim 10, further comprising:

a second timestamp counter, configured to continuously count at a fixed frequency, wherein a counted numerical value of the second timestamp counter serves as a timestamp of the chip;

wherein the second recording circuit is configured to capture the numerical value of the second timestamp counter to a register of the second recording circuit in a snapshot manner.

13. The chip according to claim 12, wherein the second synchronization control circuit is configured to:

in a case where the first timestamp is greater than the second timestamp, compute to obtain an absolute difference value between the first timestamp and the second timestamp as a first absolute difference, and control a numerical value update of the second timestamp counter based on the first absolute difference value; and in a case where the first timestamp is less than the second timestamp, compute to obtain an absolute difference value between the first timestamp and the second timestamp as a second absolute difference, and control the second timestamp counter to stop counting until a duration of stopping counting reaches a duration corresponding to the second absolute difference value.

14. The chip according to claim 13, further comprising:

a first synchronization circuit configured to trigger a numerical value update function in response to the first absolute difference value being written by the second synchronization control circuit to update the numerical value of the second timestamp counter based on the first absolute difference value; and a second synchronization circuit configured to trigger a stop counting function in response to the second absolute difference value being written by the second synchronization control circuit to make the second timestamp counter stop counting until the duration of stopping counting reaches the duration corresponding to the second absolute difference value.

15. The chip according to claim 10, further comprising:

a second synchronization interface circuit, connected to the second signal capture circuit, and configured to receive the synchronization request signal transmitted by the another chip and transmit the synchronization request signal to the second signal capture circuit, wherein the second synchronization interface circuit is an exclusive transmission interface for the synchronization request signal;

a second data interface circuit, connected to the second synchronization control circuit, and configured to receive the first timestamp sent by the another chip and send the first timestamp to the second synchronization control circuit; and a second interconnection bus, configured to connect the second synchronization control circuit and the second data interface circuit.

16. A chip system, comprising:

a first chip, which is the chip according to claim 1; and a second chip configured to be in communication connection to the first chip, comprising: a second signal response circuit and a second synchronization control circuit, wherein the second signal response circuit is configured to record a second timestamp of the chip in response to receiving a synchronization request signal from the first chip, and transmit the synchronization request signal to the second synchronization control circuit; and the second synchronization control circuit is configured to, in response to receiving the synchronization request signal, acquire the second timestamp from the second signal response circuit, and acquire a first timestamp from the first chip, and execute an across-chip timestamp synchronization operation based on the first timestamp and the second timestamp.

17. A timestamp synchronization method, used for a first chip configured to be in communication connection to a second chip, and the method comprises:

generating a synchronization request signal;

sending the synchronization request signal to the second chip, so that the second chip records a second timestamp of the second chip in response to the synchronization request signal;

performing delay processing on the synchronization request signal to obtain a delayed synchronization request signal; and recording a first timestamp of the first chip in response to the delayed synchronization request signal, wherein the first timestamp and the second timestamp are used for an across-chip timestamp synchronization operation, wherein the delay processing performed on the synchronization request signal, is configured to make a time difference between a time when the delayed synchronization request signal is responded to by a first signal response circuit of the first chip and a time when the synchronization request signal transmitted to the second chip is responded to by a second signal response circuit of the second chip is less than a time difference threshold.

18. A timestamp synchronization method, used for a second chip, the second chip is the chip according to claim 10, the second chip is configured to be in communication connection to a first chip, and the method comprises:

recording a second timestamp of the second chip in response to receiving a synchronization request signal from the first chip;

acquiring a first timestamp from the first chip, wherein the first timestamp is a timestamp of the first chip recorded by the first chip in response to a delayed synchronization request signal; and executing the across-chip timestamp synchronization operation based on the first timestamp and the second timestamp.

\* \* \* \* \*